US007285588B2

(12) United States Patent
O'Rourke et al.

(10) Patent No.: US 7,285,588 B2
(45) Date of Patent: *Oct. 23, 2007

(54) LOW POLARITY DIMERATE AND TRIMERATE ESTERS AS PLASTICIZERS FOR THERMOPLASTIC COMPOSITIONS

(75) Inventors: Stephen E. O'Rourke, Bolingbrook, IL (US); Kimberly L. Stefanisin, Oak Lawn, IL (US); Gary Wentworth, Chicago, IL (US)

(73) Assignee: Hallstar Innovations Corp., Chicago, IL (US)

( * ) Notice: Subject to any disclaimer, the term of this patent is extended or adjusted under 35 U.S.C. 154(b) by 582 days.

This patent is subject to a terminal disclaimer.

(21) Appl. No.: 10/811,510

(22) Filed: Mar. 29, 2004

(65) Prior Publication Data

US 2004/0214933 A1 Oct. 28, 2004

Related U.S. Application Data

(60) Provisional application No. 60/458,648, filed on Mar. 28, 2003, provisional application No. 60/460,903, filed on Apr. 7, 2003.

(51) Int. Cl.
*C08K 5/101* (2006.01)
*C08K 5/10* (2006.01)
(52) U.S. Cl. .................... 524/321; 524/372
(58) Field of Classification Search ................ 524/321, 524/372
See application file for complete search history.

(56) References Cited

U.S. PATENT DOCUMENTS

| | | | |
|---|---|---|---|
| 2,940,949 A | 6/1960 | Mullin et al. .............. 260/31.4 |
| 3,654,007 A | 4/1972 | Winstanley et al. ........ 156/132 |
| 3,825,515 A | 7/1974 | Lucas et al. ........... 260/31.8 M |
| 3,951,887 A | 4/1976 | Tanimura et al. .............. 260/3 |
| 3,968,198 A | 7/1976 | Honda et al. ................ 264/343 |
| 3,993,847 A | 11/1976 | Kondo ........................ 428/451 |
| 4,038,220 A | 7/1977 | Thompson ..................... 260/3 |
| 4,054,561 A | 10/1977 | Strauss et al. ............. 260/22 D |
| 4,061,835 A | 12/1977 | Poppe et al. ................ 428/522 |
| 4,078,114 A | 3/1978 | Aronoff et al. ............. 428/379 |
| 4,260,541 A | 4/1981 | Kolinsky et al. .......... 260/45.8 |
| 4,281,077 A | 7/1981 | Hirzy ........................ 525/129 |
| 4,376,711 A | 3/1983 | Shaub .................... 252/32.7 E |
| 4,472,537 A | 9/1984 | Johnson et al. ............. 523/160 |
| 4,550,147 A | 10/1985 | Oohara .................... 525/332.6 |
| 4,588,761 A | 5/1986 | Thoma et al. ................. 524/38 |
| 4,645,788 A | 2/1987 | Okumoto et al. ........... 524/308 |
| 4,656,214 A | 4/1987 | Wickson ..................... 524/287 |
| 4,683,250 A | 7/1987 | Mikami ....................... 522/33 |
| 4,789,381 A | 12/1988 | Oshiyama et al. ........... 8/115.6 |
| 4,978,392 A | 12/1990 | Kilbarger et al. ............. 106/95 |
| 4,978,716 A | 12/1990 | Flynn et al. ................ 525/195 |
| 5,021,490 A | 6/1991 | Vyvoda et al. .............. 524/140 |
| 5,057,566 A | 10/1991 | Kobayashi et al. .......... 524/297 |
| 5,071,899 A | 12/1991 | Wozniak ...................... 524/314 |
| 5,169,716 A | 12/1992 | Croft et al. ................. 428/379 |
| 5,290,886 A | 3/1994 | Ellul .......................... 524/515 |
| 5,298,539 A | 3/1994 | Singh et al. ................... 524/92 |
| 5,380,786 A | 1/1995 | Greenlee et al. ............ 524/560 |
| 5,428,089 A | 6/1995 | Ishikawa et al. ............ 524/188 |
| 5,604,277 A | 2/1997 | Osborn ....................... 524/270 |
| 5,605,955 A | 2/1997 | Hirai ........................... 524/588 |
| 5,792,805 A | 8/1998 | Williams ..................... 524/100 |
| 5,922,808 A | 7/1999 | Hanada et al. ................. 525/58 |
| 5,973,045 A | 10/1999 | Dowling et al. ............. 524/270 |
| 5,985,963 A | 11/1999 | D'Sidocky et al. .......... 524/105 |
| 6,111,004 A | 8/2000 | Biesiada et al. ............. 524/311 |
| 6,127,512 A | 10/2000 | Asrar et al. .................. 528/272 |
| 6,262,180 B1 | 7/2001 | Klun et al. .................. 525/199 |
| 6,326,426 B1 | 12/2001 | Ellul ........................... 524/270 |
| 6,369,264 B2 | 4/2002 | Day et al. ....................... 560/83 |
| 7,122,592 B2 * | 10/2006 | Wentworth et al. .......... 524/284 |
| 2002/0010275 A1 | 1/2002 | Maly et al. .................. 525/177 |
| 2003/0171471 A1 | 9/2003 | Pritschins et al. ........... 524/306 |
| 2003/0220426 A1 | 11/2003 | Wentworth et al. .......... 524/284 |
| 2003/0220427 A1 | 11/2003 | Wentworth et al. .......... 524/284 |
| 2004/0002563 A1 | 1/2004 | Wentworth et al. .......... 524/306 |
| 2004/0002564 A1 | 1/2004 | Wentworth et al. .......... 524/306 |
| 2004/0072934 A1 | 4/2004 | O'Rourke et al. ........... 524/293 |
| 2004/0122145 A1 | 6/2004 | Klosowski et al. .......... 524/284 |
| 2004/0127615 A1 | 7/2004 | Wentworth et al. .......... 524/284 |
| 2004/0127616 A1 | 7/2004 | Wentworth et al. .......... 524/284 |

FOREIGN PATENT DOCUMENTS

| | | |
|---|---|---|
| CA | 2408772 | 4/2003 |
| EP | 0 073 174 A1 | 3/1982 |
| EP | 0 450 105 A1 | 10/1991 |
| EP | 0 704 491 | 4/1996 |
| EP | 1 022 306 A1 | 7/2000 |
| EP | 1 304 210 | 4/2003 |
| FR | 2 417 522 | 9/1979 |
| GB | 1 045 577 | 10/1966 |
| JP | 06223316 | 4/1996 |
| WO | WO 2004/009692 | 1/2004 |

OTHER PUBLICATIONS

International (PCT) Search Report for PCT/US2004/009463 dated Aug. 30, 2004.

* cited by examiner

*Primary Examiner*—Tae H Yoon
(74) *Attorney, Agent, or Firm*—Marshall, Gerstein & Borun LLP

(57) ABSTRACT

A plasticized thermoplastic composition including a thermoplastic, and plasticizer compound selected from the group consisting of a cyclic dimerate ester, a cyclic trimerate ester plasticizer, and mixtures thereof.

26 Claims, No Drawings

LOW POLARITY DIMERATE AND TRIMERATE ESTERS AS PLASTICIZERS FOR THERMOPLASTIC COMPOSITIONS

This claims the priority benefit under 35 U.S.C. §119(e) of U.S. provisional patent application Ser. No. 60/458,648, filed Mar. 28, 2003, and U.S. provisional patent application Ser. No. 60/460,903, filed Apr. 7, 2003, the entire disclosures of which are hereby incorporated herein by reference.

FIELD OF THE INVENTION

The invention is directed to low polarity dimerate and/or trimerate esters for plasticizing thermoplastic compositions containing one or more thermoplastic polymers.

BACKGROUND

A number of thermoplastic compositions are very difficult to plasticize. In particular, thermoplastic compositions, including polypropylenes, are difficult to plasticize because it is difficult to find plasticizers that are sufficiently compatible with thermoplastic compositions. Consequently, exuding (bleeding) of plasticizer to the surfaces of an article comprising a thermoplastic composition frequently occurs upon cooling and crystallization of the thermoplastic composition.

Hydrocarbon-based processing oils such as naphthenic oils or paraffinic oils have been used to plasticize thermoplastics such as polypropylenes. While hydrocarbon-based processing oils can be used to plasticize thermoplastics with partial success, the resulting plasticized compositions lack advantageous low temperature properties. Moreover, the processing oils have a tendency to exude (bleed) to the surfaces of thermoplastic articles. Attempts to use conventional linear dibasic acid esters, such as dioctyl adipate or di-2-ethylhexyl sebacate, or phthalate esters, such as di-2-ethylhexyl phthalate, have also been unsuccessful since such conventional ester plasticizers are either incompatible with thermoplastics, resulting in exudation of the plasticizer, or are too volatile for many thermoplastic uses.

U.S. Pat. No. 5,290,886 teaches using organic ester plasticizers to plasticize thermoplastic elastomers comprising a blend of a thermoplastic polyolefin and an elastomer to lower the glass transition temperature (Tg) of both the elastomer and the polyolefin phases and to improve impact strength at low temperatures. The '886 patent neither discloses nor suggests using the cyclic dimerate and/or cyclic trimerate esters disclosed herein, and found that "polymeric dibasic esters and aromatic esters were found to be significantly less effective" (column 3, lines 62-64)

Dimer acid esters have been proposed as plasticizers for high temperature resistant fluorocarbon polymers (see U.S. Pat. No. 4,078,114) and for plasticizing anhydride-functionalized polymers (see U.S. Pat. No. 5,169,716), but have not been suggested for plasticizing non-fluorocarbon polymers or non-anhydride-functionalized polymers. It is preferred that the thermoplastics plasticized with the dimerate and/or trimerate esters disclosed herein are not fluorocarbon polymers or anhydride-functionalized polymers.

Surprisingly and unexpectedly, particular dimerate and/or trimerate esters designed to have very low polarity act as efficient plasticizers for thermoplastics. The resulting plasticized compositions have excellent low temperature properties and exhibit little or no tendency of the plasticizer to exude or bleed to the surface of a thermoplastic composition. Using the low polarity dimerate and/or trimerate esters as a plasticizer provides an advantageous balance of flexibility, impact resistance, and strength to thermoplastic-containing compositions.

SUMMARY OF THE INVENTION

In brief, the use of long chain cyclic dimerate and/or trimerate ester plasticizers formed from mono-, di-, and/or tri-carboxylic acids, reacted with an alcohol containing a $C_3$-$C_{24}$ alkyl group, in one or more thermoplastics, unexpectedly improves the low temperature properties of the thermoplastic composition for uses in various molded and extruded products such as automobile bumpers, industrial and municipal pipe, outdoor patio furniture, appliance housings, and the like. Additionally, by adding one or more long chain cyclic dimerate and/or trimerate esters (di-, and/or tri-esters) in accordance with the disclosure to a thermoplastic composition, particularly dimerate esters formed by reacting the dimers and trimers of $C_{18}$ fatty acids with $C_3$-$C_{24}$ alcohols, preferably, $C_3$-$C_{18}$ alcohols, more preferably, $C_6$-$C_{18}$ alcohols, the low temperature characteristics of the thermoplastic composition are surprisingly improved. Preferably, the long chain cyclic dimerate and/or trimerate ester plasticizers are formed by reacting a $C_3$-$C_{18}$ alcohol with a mixture of mono-, di, and tri-fatty acids, e.g., primarily C18 carboxylic acids, and their dimers and trimers.

DETAILED DESCRIPTION OF THE PREFERRED EMBODIMENTS

The cyclic dimerate and/or trimerate ester plasticizers described herein are added to a composition containing one or more thermoplastic polymers. Surprisingly, the cyclic dimerate and trimerate ester plasticizers disclosed herein significantly increase the low temperature properties of the resulting plasticized, thermoplastic composition and provide an excellent and unexpected balance of flexibility, impact resistance, and strength to the same.

The cyclic esters may be diesters (i.e., have two ester functionalities), triesters (i.e., have three ester functionalities), or mixtures thereof, that may include saturated or unsaturated hydrocarbon chains, straight chain or branched, having zero to six double bonds in the hydrocarbon chains. While cyclic monoesters are less preferred, they also may successfully be used in accordance with the present disclosure.

Many of the cyclic diester and/or cyclic triester materials are formed from self reaction of naturally derived fatty acid mixtures containing oleic, linoleic, and linolenic acids, and consequently are blends of mono-, di-, and tri-carboxylic acid esters. The ester blends may also include additional compounds that do not adversely affect the advantages imparted to a thermoplastic composition by the cyclic dimerate and/or trimerate esters described herein.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The cyclic diesters, referred to herein as dimerates, have a formula I, as follows:

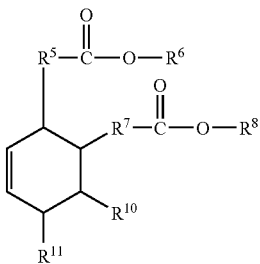

wherein $R^5$ and $R^7$, same or different, are a $C_3$-$C_{24}$, preferably $C_6$-$C_{24}$, more preferably $C_8$-$C_{18}$ hydrocarbon chain, straight chain or branched, either saturated or containing 1 to 6, preferably 1 to 3, carbon-to-carbon double bonds;

$R^6$ and $R^8$, same or different, are a $C_3$-$C_{24}$ alkyl, preferably $C_3$-$C_{18}$ alkyl, more preferably $C_6$-$C_{18}$ alkyl, straight chain or branched, saturated or unsaturated containing 1 to 3 carbon-to-carbon double bonds; and $R_{10}$ and $R^{11}$, same or different, are a $C_3$-$C_{24}$, preferably $C_3$-$C_{18}$, more preferably $C_6$-$C_{18}$ saturated hydrocarbon chain, straight chain or branched, or unsaturated $C_3$-$C_{24}$, preferably $C_3$-$C_{18}$, more preferably $C_6$-$C_{18}$ hydrocarbon chains, straight chain or branched, containing 1 to 6, preferably 1 to 3, carbon-to-carbon double bonds.

The cyclic triesters, referred to herein as trimerates, have a formula II, as follows:

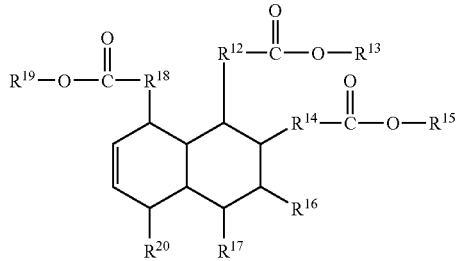

wherein $R^{12}$, $R^{14}$ and $R^{18}$, same or different, are a $C_3$-$C_{24}$, preferably $C_6$-$C_{24}$, more preferably $C_8$-$C_{18}$ hydrocarbon chain, straight chain or branched, either saturated or containing 1 to 6, preferably 1 to 3, carbon-to-carbon double bonds;

$R^{13}$, $R^{15}$ and $R^{19}$, same or different, are a $C_3$-$C_{24}$, preferably $C_3$-$C_{18}$, more preferably $C_6$-$C_{18}$ alkyl, straight chain or branched, saturated or unsaturated containing 1 to 3 carbon-to-carbon double bonds; and $R^{16}$, $R^{17}$ and $R^{20}$, same or different, are a saturated $C_3$-$C_{24}$, preferably $C_3$-$C_{18}$, more preferably $C_6$-$C_{18}$ hydrocarbon chain, straight chain or branched; or an unsaturated $C_3$-$C_{24}$, preferably $C_3$-$C_{18}$, more preferably $C_6$-$C_{18}$ hydrocarbon chain, straight chain or branched, containing 1 to 6, preferably 1 to 3, carbon-to-carbon double bonds.

The low polarity of the cyclic ester compounds disclosed herein is important for successfully plasticizing thermoplastic compositions. Low polarity cyclic ester compounds, e.g., ester compounds formed from dimer acids and alcohols having only acidic carboxyl groups are preferred (i.e., the dimer acids do not contain other non-acidic hydroxyl substituents) and alcohols having a single hydroxyl group are therefore preferred for making same. Similarly, it is preferred that $R^6$, $R^8$, $R^{13}$, $R^{15}$, and $R^{19}$ of formulas I and II do not contain hydroxyl substituents. Furthermore, dimerate esters formed from dimer acids and glycol type alcohols, for example, glycol alcohols such as ethylene glycol, diethylene glycol, triethylene glycol, and other polyethylene glycols, would be too polar to plasticize thermoplastic compositions while simultaneously providing superior low temperature properties. Additionally, esters prepared by reacting dimer acids with the glycol functionalized monomers and oligomers set forth in U.S Pat. No. 4,054,561 would also be too polar for use as plasticizers for thermoplastics.

Useful cyclic diesters falling within formula I include dimerate ester structures formed by the reaction of a $C_{36}$ dimer acid derived from tall oil fatty acids and a $C_3$-$C_{24}$, preferably $C_3$-$C_{18}$, more preferably $C_6$-$C_{18}$ alcohol, straight chain or branched, saturated or unsaturated containing 1 to 3 carbon-to-carbon double bonds. Examples of such cyclic esters include the following structures, wherein the dimer acid corresponding to structure A is formed by self reaction of linoleic acid, the dimer acid corresponding to structure B is formed by reacting linoleic acid with oleic acid, and the dimer acid corresponding to structure C is formed by reacting linoleic acid with linolenic acid:

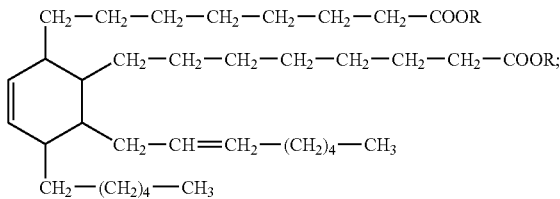

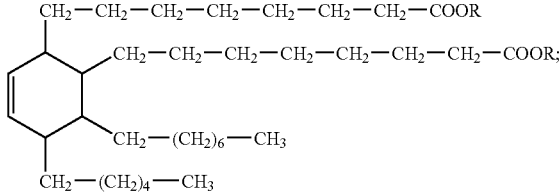

and

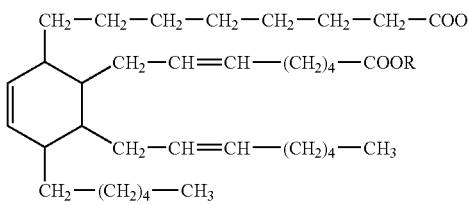

wherein each R, same or different, in formulas (A), (B), and (C) is a $C_3$-$C_{24}$ radical, preferably $C_3$-$C_{18}$, more preferably $C_6$-$C_{18}$, straight chain or branched, saturated or unsaturated containing 1 to 3 carbon-to-carbon double bonds.

RX-13804, RX-13824, and RX-13892 are additional examples of dimerate esters in accordance with formula I. RX-13804 is formed by the reaction of a predominantly $C_{36}$ dimer acid with 2-ethylhexyl alcohol. RX-13824 is formed by the reaction of a predominantly $C_{36}$ dimer acid with tridecyl alcohol. RX-13892 is formed by the reaction of a predominantly $C_{36}$ dimer acid with oleyl alcohol.

A representative example of a triester (trimerate ester) in accordance with formula II is the following structure (D):

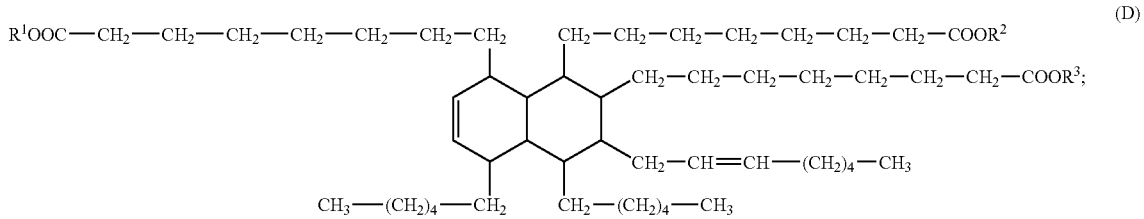

wherein each $R^1$, $R^2$, and $R^3$, same or different, is a $C_3$-$C_{24}$ radical, preferably $C_3$-$C_{18}$, more preferably $C_6$-$C_{18}$, straight chain or branched, saturated or unsaturated containing 1 to 3 carbon-to-carbon double bonds.

Throughout the specification, the term dimerate is sometimes used when referring to mixtures of structures in accordance with both formulas I and II (i.e., dimerates and trimerates).

The cyclic ester plasticizers of formula I, II, or mixtures thereof are typically added to a thermoplastic composition comprising one or more thermoplastic polymers in an amount of about 0.1 parts to about 40 parts by weight, preferably from about 0.5 parts to about 20 parts, more preferably from about 3 parts to about 15 parts per 100 parts by weight of the thermoplastic polymer(s) in the thermoplastic composition.

A particularly useful blend of carboxylic acids for forming cyclic esters in accordance with the disclosure is a blend of carboxylic acids known as dimer acid having CAS#: 61788-89-4, which is a blend including primarily, $C_{36}$ and $C_{54}$ dimer and trimer acids, and predominantly (more than 50% by weight) $C_{36}$ dimer acid.

The fatty acid residues or hydrocarbon chains $R^5$, $R^7$, $R^{12}$, $R^{14}$ and $R^{18}$ of the esters of formulas I and II can be any $C_3$-$C_{24}$, preferably $C_6$-$C_{24}$, more preferably $C_8$-$C_{18}$ hydrocarbon chain, either saturated or containing 1 to 6, preferably 1 to 3, carbon-to-carbon double bonds. The fatty acids can be derived from animal or vegetable fatty acids such as butter; lard; tallow; grease; herring; menhaden; pilchard; sardine; babassu; castor; coconut; corn; cottonseed; jojoba; linseed; oiticica; olive; palm; palm kernel; peanut; rapeseed; safflower; soya; sunflower; tall; and/or tung. Examples are the hydrocarbon chain residues from the following fatty acids, where the number in parentheses indicates the number of carbon atoms, and the number of double bonds, e.g., ($C_{24-6}$) indicates a hydrocarbon chain having 24 carbon atoms and 6 double bonds: hexanoic ($C_{6-0}$); octanoic ($C_{8-0}$); decanoic ($C_{10-0}$); dodecanoic ($C_{12-0}$); 9- dodecenoic (CIS) ($C_{12-1}$); tetradecanoic ($C_{14-0}$); 9-tetradecenoic (CIS) ($C_{14-1}$); hexadecanoic (CIS) ($C_{16-0}$); 9-hexadecenoic (CIS) ($C_{16-1}$); octadecanoic ($C_{18-0}$); 9-octadecenoic (CIS) ($C_{18-1}$); 9,12-octadecadienoic (CIS, CIS) ($C_{18-2}$); 9, 12, 15-octadecatrienoic (CIS, CIS, CIS) ($C_{18-3}$); 9, 11, 13-octadecatrienoic (CIS, TRANS, TRANS) ($C_{18-3}$); octadecatetraenoic ($C_{18-4}$); eicosanoic ($C_{20}$); 11-eicosenoic (CIS) ($C_{20-1}$); eicosadienoic ($C_{20-2}$); eicosatrienoic ($C_{20-3}$); 5, 8, 11, 14-eicosatetraenoic ($C_{20-4}$); eicosapentaenoic ($C_{20-5}$); docosanoic ($C_{22}$); 13-docosenoic (CIS) ($C_{22-1}$); docosatetraenoic ($C_{22-4}$); 4, 8, 12, 15, 19-docosapentaenoic ($C_{22-5}$); docosahexaenoic ($C_{22-6}$); tetracosenoic ($C_{24-1}$); and 4, 8, 12, 15, 18, 21-tetracosahexaenoic ($C_{24-6}$).

Commercially available blends of useful polybasic acids that can be reacted with $C_3$-$C_{24}$, preferably $C_3$-$C_{18}$, more preferably $C_6$-$C_{18}$ alcohols, straight chain or branched, saturated or unsaturated containing 1 to 3 carbon-to-carbon double bonds to produce the dimerate and trimerate esters as blends, include the following: EMPOL® 1010 Dimer Acid; EMPOL® 1014 Dimer Acid; EMPOL® 1016 Dimer Acid; EMPOL® 1018 Dimer Acid; EMPOL® 1022 Dimer Acid; EMPOL® 1024 Dimer Acid; EMPOL® 1040 Trimer Acid; EMPOL® 1041 Trimer Acid; EMPOL® 1052 Polybasic Acid; and similar PRIPOL™ products from Uniqema as well as UNIDYME® products from Arizona Chemical.

Particularly useful ester additives are made by reacting any of the long chain mono, dimer and/or trimer acids with one or more straight chain or branched $C_3$-$C_{24}$, preferably $C_3$-$C_{18}$, more preferably $C_6$-$C_{18}$ alcohols to produce esters in accordance with formulas I and II.

The above dimer, trimer, and polybasic acids are produced by dimerizing, trimerizing, and polymerizing (oligomerizing) carboxylic acids, typically $C_{18}$ fatty acids. The $C_{18}$ fatty acids are typically mixtures. For example, the dimer acid produced from a $C_{18}$ carboxylic acids (e.g., a mixture of stearic, oleic, linoleic, and linolenic) will result in a blend of numerous cyclic dimerate and trimerate esters, as in formulas I and II, some saturated and some containing hydrocarbon chains having 1 to 6, generally 1 to 3, carbon-to-carbon double bonds. Any one, or any blend, of the esters that include the cyclic dimerate and/or cyclic trimerate esters in accordance with formulas I or II will function to plasticize thermoplastics, and provide a balance of flexibility, strength, and low temperature properties, with essentially no bleeding of the plasticizer to the surface of the thermoplastic articles. Particularly, the plasticized thermoplastic compositions described herein are characterized in that the low temperature properties are improved to provide a balance of good flexibility and strength at low temperatures.

As used herein, thermoplastics generally include synthetic high polymers that soften when exposed to heat and return to their original state when cooled to room temperature. More specifically, thermoplastics that can be successfully plasticized using the long chain ester plasticizers described herein include polyvinyl chlorides, nylons, propylene/α-olefin copolymers, ethylene/α-olefin copolymers such as, for example, ethylene/propylene copolymers and ethylene/1-octene copolymers, polyolefins such as polyethylenes and polypropylenes, polystyrenes such as styrene/ethylene block copolymers and hydrogenated styrene/butadiene block copolymers, acrylic resins, and combinations thereof.

Preferably, the plasticizers described herein plasticize thermoplastics, such as polypropylenes, propylene/α-olefin copolymers, ethylene/α-olefin copolymers, block copolymers of styrene with ethylene, hydrogenated styrene/butadiene block copolymers, and combinations thereof. Most preferably, the plasticizers described herein plasticize ethylene/1-octene copolymers and polypropylene blended with ethylene/propylene copolymers.

The plasticizers described herein are particularly preferred for plasticizing polypropylenes. Commodity grades of polypropylenes typically have a high degree of crystallinity.

Objects made from such commodity grades typically lack flexibility and can be somewhat brittle, especially at low temperature. The addition of one or more of the long chain cyclic ester plasticizers disclosed herein gives such grades of polypropylenes a highly desirable balance of flexibility, impact resistance, and strength.

The invention may be better understood by reference to the following examples in which parts and percentages are by weight unless otherwise indicated.

As shown in the examples, thermoplastics plasticized with dimerates exhibit lower weight losses when compared with conventional dibasic esters, and reduced melt torque and improved low temperature properties when compared with paraffinic oils.

In the following examples, cyclic dimerate esters and conventional plasticizers such as tridecyl tallate, dioctyl sebacate, and paraffinic oil were applied to two different polypropylene samples. The two polypropylene samples differ in molecular weight and melt flow rate. As used herein, melt flow or melt index values indicate the amount of plastic that can extruded in ten minutes through an opening under a prescribed load. The 1012 polymer is a higher molecular weight polymer which has a lesser melt flow rate (1.2 grams vs. 20 grams) than the 1246 polymer. Both the 1012 and 1246 polymers are commodity grade polypropylenes.

Tables I and II include data relating to the original physical properties, such as stress, strain, and fusion torque, of polypropylene samples plasticized with plasticizers in accordance with the disclosure. Fusion characteristics were measured using a Polylab System® torque rheometer from Thermo Haake using a Rheomix® 600 mixing head. Conditions for mixing measurements generally were about 170° C.-200° C./77 rpm.

As shown therein, thermoplastic olefins plasticized with dimerates exhibit lower weight losses upon heat aging, as compared to conventional dibasic esters, and reduced melt torque and improved low temperature properties when compared to paraffinic oils. These attributes are especially important in applications such as automotive interior, film packaging, low temperature impact resistance, and other applications requiring improved processing and flexibility.

Results

The processing properties of polypropylene plasticized with dimerate esters show results which are equal to (if not better than) those achieved with the use of conventional plasticizer compounds. For example, the air oven aging data of Table I shows that dimerate plasticizers (examples 2-4) are less volatile when compared with conventional linear dibasic acid ester compounds such as DOS (example 5) and tridecyl tallate (example 1). Further, when compared with paraffinic oil (example 6), the addition of dimerate plasticizers to the polypropylene sample substantially reduces melt torque.

Glass transition data also indicate that dimerate plasticizers effectively plasticize thermoplastic compositions. For example, as shown in Table 1, examples 2 and 3 (containing dimerate plasticizer compounds in accordance with the disclosure) had lower glass transition temperatures (i.e., possess superior low temperature properties) than examples 5 (containing DOS) and 6 (containing paraffinic oil).

TABLE I

| Example | 1 | 2 | 3 | 4 | 5 | 6 | 7 |
|---|---|---|---|---|---|---|---|
| Homopolymer 1246 Injection Molding Resin | 100.0 | → | | | | | |
| TE-577 | 10.0 | — | — | — | — | — | — |
| RX-13804 | — | 10.0 | — | — | — | — | — |
| RX-13824 | — | — | 10.0 | — | — | — | — |
| RX-13892 | — | — | — | 10.0 | — | — | — |
| Plasthall ® DOS | — | — | — | — | 10.0 | — | — |
| Sunpar 2280 | — | — | — | — | — | 10.0 | — |
| Total | 110.0 | 110.0 | 110.0 | 110.0 | 110.0 | 110.0 | 100.0 |
| Major Variable | TE-577 | RX-13804 | RX-13824 | RX-13892 | Plasthall DOS | Sunpar 2280 | Unplast |
| Original Physical Properties | | | | | | | |
| Stress @ Peak, MPa | 25.4 | 26.4 | 25.9 | 25.1 | 28.3 | 25.6 | 37.9 |
| psi | 3685 | 3825 | 3765 | 3640 | 4105 | 3710 | 5495 |
| Strain @ Break, % | 4 | 2 | 9 | 5 | 6 | 8 | 5 |
| Hardness Duro D, pts. | 69 | 66 | 67 | 66 | 65 | 67 | 73 |
| Specific Gravity | 0.900 | 0.901 | 0.886 | 0.890 | 0.907 | 0.894 | 0.905 |
| Tg-° C. | 0 | 5 | 5 | 7 | 12 | 8 | 15 |
| Rheomix 600 77 RPM 170° C. | | | | | | | |
| Fusion Torque, mg | 805 | 1100 | 1200 | 1090.8 | 1000 | 917.7 | 2258.1 |
| Fusion Temperature, ° C. | 151 | 154 | 154 | 154 | 152 | 155 | 157 |
| Melt Temperature, ° C. | 194 | 174 | 175 | 174 | 174 | 176 | 176 |
| Melt Torque, mg | 88.8 | 186.0 | 181.4 | 178.5 | 153.0 | 215.0 | 350.0 |
| Energy, kJ | 9.0 | 17.5 | 18.0 | 17.5 | 15.0 | 19.0 | 34.5 |
| Air Oven Aging, 3 days @ 125° C. | | | | | | | |
| Tensile Ultimate @ Break, MPa | 21.6 | 25.2 | 25.3 | 24.3 | 30.5 | 25.3 | 40.1 |
| psi | 3135 | 3660 | 3665 | 3525 | 4420 | 3675 | 5815 |
| Tensile Change, % | −15 | −4 | −3 | −3 | 8 | −1 | 6 |

TABLE I-continued

| Example | 1 | 2 | 3 | 4 | 5 | 6 | 7 |
|---|---|---|---|---|---|---|---|
| Elongation @ Break, % | 2.5 | 4.9 | 9.6 | 12.1 | 1.3 | 6.5 | 6.4 |
| Elongation Change, % | −38 | 145 | 7 | 142 | −78 | −19 | 28 |
| Hardness, Duro D, pts. | 67 | 69 | 69 | 69 | 71 | 69 | 71 |
| Hardness Change, pts. | −2 | 3 | 2 | 3 | 6 | 2 | −2 |
| Weight Change, % | −4.4 | −0.7 | −0.7 | −0.6 | −8.1 | −0.8 | −0.6 |

Results

The processing properties of polypropylene plasticized with dimerate esters show results which are as good as (if not better) than achieved with the use of conventional plasticizer compounds. For example, the air oven aging data of Table II shows that dimerate plasticizers (examples 9-11) are less volatile when compared with conventional linear dibasic acid ester compounds such as DOS (example 12) and tridecyl tallate (example 8). The air oven aging results show that the dimerates are essentially equal to the paraffinic oil in weight loss, which is a significant improvement over conventional organic ester plasticizers and tallate compounds. Further, when compared with paraffinic oil (example 13), the addition of dimerate plasticizers to the polypropylene sample substantially reduces melt torque. Therefore, the long chain cyclic ester plasticizers described herein provide superior processing properties with respect to such conventional plasticizing agents.

TABLE II

| Example | 8 | 9 | 10 | 11 | 12 | 13 | 14 |
|---|---|---|---|---|---|---|---|
| Homopolymer 1012 Fiber Resin | 100.00 | → | → | → | → | → | → |
| TE-577 | 10.0 | — | — | — | — | — | — |
| RX-13804 | — | 10.0 | — | — | — | — | — |
| RX-13824 | — | — | 10.0 | — | — | — | — |
| RX-13892 | — | — | — | 10.0 | — | — | — |
| Plasthall ® DOS | — | — | — | — | 10.0 | — | — |
| Sunpar 2280 | — | — | — | — | — | 10.0 | — |
| Total | 110.0 | 110.0 | 110.0 | 110.0 | 110.0 | 110.0 | 100.0 |
| Major Variable | TE-577 | RX-13804 | RX-13824 | RX-13892 | Plasthall DOS | Sunpar 2280 | Unplast |
| Original Physical Properties | | | | | | | |
| Stress @ Peak, MPa | 28.4 | 29.3 | 29.5 | 27.8 | 28.5 | 29.6 | 37.3 |
| psi | 4120 | 4255 | 4275 | 4036.5 | 4130 | 4295 | 5405 |
| Strain @ Break, % | 18.6 | 29.1 | 48.7 | 19.4 | 31.8 | 78.2 | 17 |
| Hardness Duro D, pts. | 66 | 67 | 65 | 67 | 67 | 69 | 75 |
| Specific Gravity | 0.902 | 0.918 | 0.886 | 0.883 | 0.891 | 0.857 | 0.874 |
| Rheomix 600 77 RPM, 200° C. | | | | | | | |
| Fusion Torque, mg | 1750 | 1892 | 1639 | 1660 | 1711 | 1847.5 | 2475 |
| Fusion Temperature, ° C. | 165 | 167 | 167 | 167 | 165 | 171 | 186 |
| Melt Temperature, ° C. | 207 | 207 | 207 | 207 | 208 | 209 | 211 |
| Melt Torque, mg | 344 | 471 | 456 | 470 | 550 | 528 | 781 |
| Energy, kJ | 27 | 33 | 31 | 31 | 35 | 33 | 46 |
| Air Oven Aging, 3 days @ 125° C. | | | | | | | |
| Tensile Ultimate @ Break, MPa | *TB | 4.1 | 2.1 | 4.0 | 22.5 | 28.9 | 35.8 |
| psi | | 590 | 305 | 585 | 3265 | 4185 | 5190 |
| Tensile Change, % | | −86 | −93 | −86 | −21 | −3 | −4 |
| Elongation @ Break, % | | 0 | 0 | 0 | 9 | 100 | 24 |
| Elongation Change, % | | −100 | −100 | −100 | −72 | 28 | 41 |
| Hardness Duro A, pts. | | 70 | 69 | 66 | 71 | 65 | 75 |
| Hardness Change, pts. | | 3 | 4 | −1 | 4 | −4 | 0 |
| Weight Change, % | | −0.5 | −2.1 | −1.7 | −6.8 | −1.2 | 0.0 |

*TB—too brittle to test

| Material List for Tables I & II | | |
|---|---|---|
| Material | Chemical Description | Supplier |
| Homopolymer 1012 Fiber Resin | polypropylene homopolymer MFR 1.2 | BP Amoco |
| Homopolymer 1246 Injection Molding Resin | polypropylene homopolymer MFR 20 | BP Amoco |
| Hallco TE-577 | Tridecyl Tallate | The C. P. Hall Company |
| RX-13804 | Di(2-ethylhexyl) dimerate | The C. P. Hall Company |
| RX-13824 | Di(tridecyl) dimerate | The C. P. Hall Company |
| RX-13892 | Diolelyl dimerate | The C. P. Hall Company |
| Plasthall DOS | Dioctyl Sebacate | The C. P. Hall Company |
| Sunpar 2280 | Paraffinic Oil | Sun Chemical |

What is claimed is:

1. A plasticized thermoplastic composition comprising one or more thermoplastics and a plasticizer compound selected from the group consisting of a dimerate ester plasticizer having formula I, a trimerate ester plasticizer having formula II, and mixtures thereof:

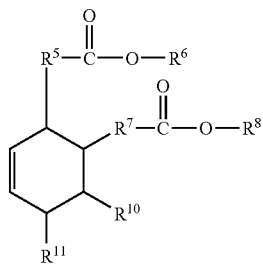

(I)

wherein $R^5$ and $R^7$, same or different, are a $C_3$-$C_{24}$ hydrocarbon chain, straight chain or branched, either saturated or having 1 to 6 carbon-to-carbon double bonds;

$R^6$ and $R^8$, same or different, are a $C_3$-$C_{24}$ hydrocarbon chain, straight chain or branched, saturated or unsaturated containing 1 to 3 carbon-to-carbon double bonds; and $R^{10}$ and $R^{11}$, same or different, are a $C_3$-$C_{24}$ saturated hydrocarbon chain, straight chain or branched, or an unsaturated $C_3$-$C_{24}$ hydrocarbon chain, straight chain or branched, having 1 to 6 carbon-to-carbon double bonds;

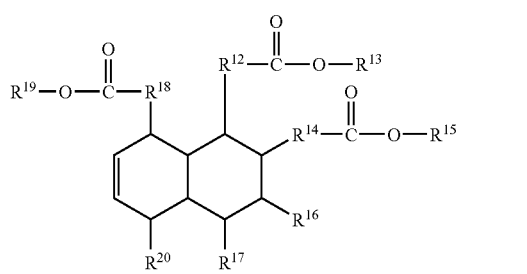

(II)

wherein $R^{12}$, $R^{14}$ and $R^{18}$, same or different, are a $C_3$-$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$-$C_{24}$ hydrocarbon chain, straight chain or branched, saturated or unsaturated containing 1 to 3 carbon-to-carbon double bonds; and $R^{16}$, $R^{17}$ and $R^{20}$, same or different, are a $C_3$-$C_{24}$ saturated hydrocarbon chain, straight chain or branched, or an unsaturated $C_3$-$C_{24}$ hydrocarbon chain, straight chain or branched, containing 1 to 6 carbon-to-carbon double bonds.

2. A plasticized thermoplastic composition in accordance with claim 1, wherein:

$R^5$ and $R^7$, same or different, are a $C_6$-$C_{24}$ hydrocarbon chain, straight chain or branched, either saturated or having 1 to 3 carbon-to-carbon double bonds;

$R^6$ and $R^8$, same or different, are a $C_3$-$C_{18}$ hydrocarbon chain, straight chain or branched, saturated or unsaturated containing 1 to 3 carbon-to-carbon double bonds, and $R^{10}$ and $R^{11}$, same or different, are a $C_3$-$C_{18}$ saturated hydrocarbon chain, straight chain or branched, or an unsaturated $C_3$-$C_{18}$ hydrocarbon chain, straight chain or branched, containing 1 to 3 carbon-to-carbon double bonds;

$R^{12}$, $R^{14}$ and $R^{18}$, same or different, are a $C_6$-$C_{24}$ hydrocarbon chain, straight chain or branched, either saturated or containing 1 to 3 carbon-to-carbon double bonds;

$R^{13}$, $R^{15}$ and $R^{19}$, same or different, are a $C_3$-$C_{18}$ hydrocarbon chain, straight chain or branched, saturated or unsaturated containing 1 to 3 carbon-to-carbon double bonds; and, $R^{16}$, $R^{17}$ and $R^{20}$, same or different, are a $C_3$-$C_{18}$ saturated hydrocarbon chain, straight chain or branched; or an unsaturated $C_3$-$C_{18}$ hydrocarbon-chain, straight chain or branched, containing 1 to 3 carbon-to-carbon double bonds.

3. A plasticized thermoplastic composition in accordance with claim 1, wherein the plasticizer compound is present in an amount from about 0.1 parts to about 40 parts by weight per 100 parts of thermoplastic.

4. A plasticized thermoplastic composition in accordance with claim 1, wherein the plasticizer compound is present in an amount from about 0.5 parts to about 20 parts per 100 parts of thermoplastic.

5. A plasticized thermoplastic composition in accordance with claim 1, wherein the plasticizer compound is present in an amount from about 3 parts to about 15 parts per 100 parts of thermoplastic.

6. A plasticized thermoplastic composition in accordance with claim 1, wherein the thermoplastic is selected from the group consisting of polyvinyl chlorides, nylons, propylene/α-olefin copolymers, ethylene/α-olefin copolymers, polyolefins, polystyrenes, acrylic resins, and combinations thereof.

7. A plasticized thermoplastic composition in accordance with claim 1, wherein the thermoplastic is selected from the group consisting of ethylene/propylene copolymers, ethylene/1-octene copolymers, polypropylenes, and combinations thereof.

8. A plasticized thermoplastic composition in accordance with claim 1, wherein the plasticizer is an unsaturated diester formed by the reaction of a $C_{36}$ dimer acid and a $C_3$-$C_{18}$ alcohol, straight chain or branched, saturated or containing 1 to 3 carbon-to-carbon double bonds.

9. A plasticized thermoplastic composition in accordance with claim 8, wherein the alcohol is 2-ethylhexyl alcohol.

10. A plasticized thermoplastic composition in accordance with claim 8, wherein the alcohol is tridecyl alcohol.

11. A plasticized thermoplastic composition in accordance with claim 8, wherein the alcohol is oleyl alcohol.

12. A plasticized thermoplastic composition in accordance with claim 1, wherein the plasticizer comprises a reaction product of the following dimer acid reacted with a $C_3$-$C_{24}$ alcohol:

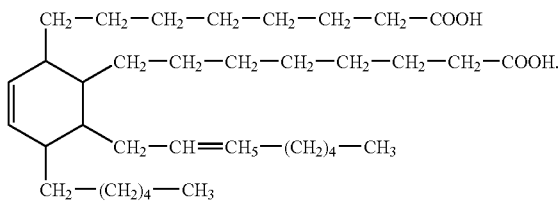

13. A plasticized thermoplastic composition in accordance with claim 1, wherein the plasticizer comprises a reaction product of the following dimer acid reacted with a $C_3$-$C_{24}$ alcohol:

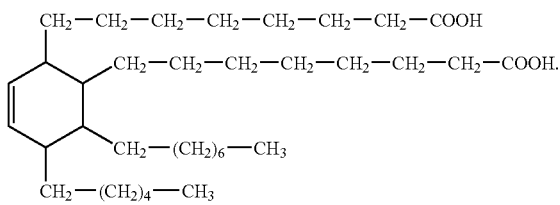

14. A plasticized thermoplastic composition in accordance with claim 1, wherein the plasticizer comprises a reaction product of the following dimer acid reacted with a $C_3$-$C_{24}$ alcohol:

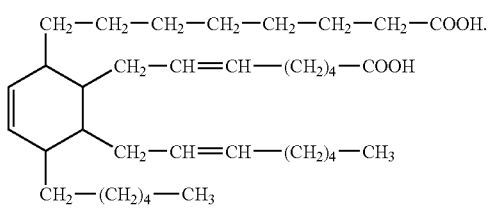

15. A plasticized thermoplastic composition in accordance with claim 1, wherein the plasticizer comprises a reaction product of a $C_3$-$C_{24}$ alcohol reacted with a tricarboxylic acid having the following formula:

16. A plasticized thermoplastic composition. in accordance with claim 1, wherein the plasticizer is a mixture of compounds represented by formula I and II.

17. A plasticized thermoplastic composition in accordance with claim 1, wherein the plasticizer is a reaction product of a $C_3$-$C_{24}$ alcohol, straight chain or branched, saturated or unsaturated having 1 to 3 carbon-to-carbon double bonds, reacted with a dimer acid.

18. A plasticized thermoplastic composition in accordance with claim 17, wherein the alcohol is 2-ethylhexyl alcohol.

19. A plasticized thermoplastic composition in accordance with claim 17, wherein the alcohol is tridecyl alcohol.

20. A plasticized thermoplastic composition in accordance with claim 17, wherein the alcohol is oleyl alcohol.

21. A plasticized thermoplastic composition in accordance with claim 1, wherein $R^5$, $R^7$, $R^{12}$, $R^{14}$ and $R^{18}$ are fatty acid residues derived from animal or vegetable fatty acids.

22. A plasticized thermoplastic composition in accordance with claim 21, wherein the fatty acids are selected from the group consisting of butter; lard; tallow; grease; herring; menhaden; pilchard; sardine; babassu; castor; coconut; corn; cottonseed; jojoba; linseed; oiticica; olive; palm; palm kernel; peanut; rapeseed; safflower; soya; sunflower; tall; tung; and mixtures thereof.

23. A plasticized thermoplastic composition of claim 22 wherein the fatty acid residues are selected from the group consisting of hexanoic; octanoic; decanoic; dodecanoic; 9-dodecenoic; tetradecanoic; 9-tetradecenoic; hexadecanoic; 9-hexadecenoic; octadecanoic; 9-octadecenoic; 9, 12-octadecadienoic; 9, 12, 15-octadecatrienoic; 9, 11, 13-octadecatrienoic; octadecatetrenoic; eicosanoic; 11-eicosenoic; eicosadienoic; eicosatrienoic; 5, 8, 11, 14-eicosatetraenoic; eicosapentaenoic; docosanoic; 13-docosenoic; docosatetraenoic; 4, 8, 12, 15, 19-docosapentaenoic; docosahexaenoic; tetracosanoic; and 4, 8, 12, 15, 18, 21-tetracosahexaenoic.

24. A method of plasticizing a thermoplastic composition including one or more thermoplastics, comprising adding to said thermoplastic composition, in an amount of about 0.1 parts to about 40 parts by weight per 100 parts of thermoplastic, a plasticizer compound selected from the group

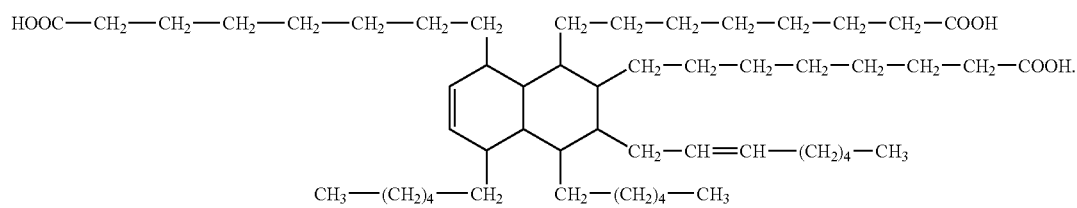

consisting of a cyclic dimerate ester plasticizer having formula I, a trimerate ester plasticizer having formula II, and mixtures thereof:

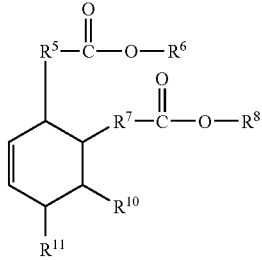

(I)

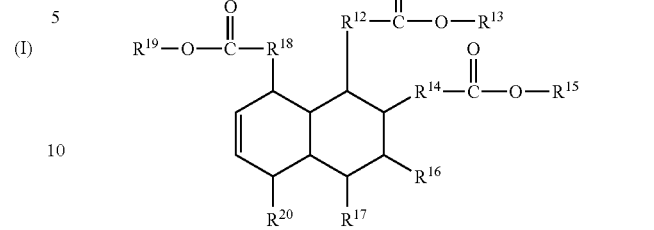

(II)

wherein $R^5$ and $R^7$, same or different, are a $C_3$-$C_{24}$ hydrocarbon chain, straight chain or branched, either saturated or having 1 to 6 carbon-to-carbon double bonds;

$R^6$ and $R^8$, same or different; are a $C_3$-$C_{24}$ hydrocarbon chain, straight chain or branched, saturated or unsaturated containing 1 to 3 carbon-to-carbon double bonds; and $R^{10}$ and $R^{11}$, same or different, are a $C_3$-$C_{24}$ saturated hydrocarbon chain, straight chain or branched, or an unsaturated $C_3$-$C_{24}$ hydrocarbon chain, straight chain or branched, having 1 to 6 carbon-to-carbon double bonds;

wherein $R^{12}$, $R^{14}$ and $R^{18}$, same or different, are a $C_3$-$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$-$C_{24}$ hydrocarbon chain, straight chain or branched, saturated or unsaturated containing 1 to 3 carbon-to-carbon double bonds; and $R^{16}$, $R^{17}$ and $R^{20}$, same or different, are a $C_3$-$C_{24}$ saturated hydrocarbon chain, straight chain or branched, or an unsaturated $C_3$-$C_{24}$ hydrocarbon chain, straight chain or branched, containing 1 to 6 carbon-to-carbon double bonds.

25. A method in accordance with claim 24, wherein the plasticizer compound is added in an amount from about 0.5 parts to about 25 parts by weight per 100 parts of thermoplastic.

26. A method in accordance with claim 24, wherein the plasticizer compound is added in an amount from about 3 parts to about 15 parts per 100 pails of thermoplastic.

* * * * *

UNITED STATES PATENT AND TRADEMARK OFFICE
CERTIFICATE OF CORRECTION

PATENT NO.        : 7,285,588 B2
APPLICATION NO.   : 10/811510
DATED             : October 23, 2007
INVENTOR(S)       : O'Rourke et al.

It is certified that error appears in the above-identified patent and that said Letters Patent is hereby corrected as shown below:

In the Claims:

At Column 14, line 1, "A plasticized thermoplastic composition." should read as -- A plasticized thermoplastic composition --.

At Column 14, line 29, "cottonseed; jojoba; linseed; oiticica; olive; palm;" should read as -- cottonseed; jojoba; linseed; oiticia; olive; palm; --.

At Column 16, line 33, "parts to about 15 parts per 100 pails" should read as -- parts to about 15 parts per 100 parts --.

Signed and Sealed this

Thirty-first Day of March, 2009

JOHN DOLL
*Acting Director of the United States Patent and Trademark Office*